United States Patent
Bernstein et al.

(10) Patent No.: US 10,089,123 B2
(45) Date of Patent: Oct. 2, 2018

(54) VIRTUAL CABLE MODEM TERMINATION SYSTEM REDUNDANCY IN A CABLE MODEM NETWORK ENVIRONMENT

(71) Applicant: CISCO TECHNOLOGY, INC., San Jose, CA (US)

(72) Inventors: Alon Bernstein, Monte Sereno, CA (US); John T. Chapman, Coto de Caza, CA (US); Amit Singh, Woodside, CA (US); Jan Medved, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 55 days.

(21) Appl. No.: 14/807,720

(22) Filed: Jul. 23, 2015

(65) Prior Publication Data

US 2016/0328251 A1 Nov. 10, 2016

Related U.S. Application Data

(60) Provisional application No. 62/156,770, filed on May 4, 2015.

(51) Int. Cl.
*G06F 9/455* (2018.01)
*H04L 12/28* (2006.01)
*H04L 12/46* (2006.01)

(52) U.S. Cl.
CPC .......... *G06F 9/455* (2013.01); *G06F 9/45558* (2013.01); *H04L 12/2801* (2013.01); *H04L 12/2885* (2013.01); *H04L 12/4633* (2013.01); *G06F 2009/4557* (2013.01)

(58) Field of Classification Search
CPC ....... H04L 67/16; H04L 67/02; H04L 67/101; H04L 12/2801; H04L 12/2885; H04L 12/4633; H04L 43/10–43/106; G06F 9/455; G06F 9/45558; G06F 2009/4557
See application file for complete search history.

(56) References Cited

U.S. PATENT DOCUMENTS

| 9,258,237 B1 * | 2/2016 | Smith | H04L 47/122 |
| 9,430,262 B1 * | 8/2016 | Felstaine | G06F 9/45558 |
| 2003/0189898 A1 | 10/2003 | Frick | |

(Continued)

OTHER PUBLICATIONS

Chiosi, et al., "Network Functions Virtualisation," White Paper, SDN and OpenFlow World Congress, Darmstadt-Germany, Oct. 22-24, 2012, 16 pages; http://portal.etsi.org/NFV/NFV_White_Paper.pdf.

(Continued)

*Primary Examiner* — Michael Thier
*Assistant Examiner* — Prince Akwasi Mensah
(74) *Attorney, Agent, or Firm* — Merchant & Gould P.C.

(57) ABSTRACT

An example system and method for facilitating virtual cable modem termination system VCMTS redundancy in cable modem network environments is provided and includes spawning a first instance of a virtual network function (VNF) on a first server in a cable modem network, spawning a second instance of the VNF on a different second server, configuring the second instance to be communicatively coupled to the first instance in a same subnet of the network, and synchronizing (e.g., copying, coordinating, matching, etc.) state between the first instance and the second instance. In specific embodiments, the VNF comprises a VCMTS.

20 Claims, 8 Drawing Sheets

(56) References Cited

U.S. PATENT DOCUMENTS

| | | |
|---|---|---|
| 2006/0072480 A1* | 4/2006 | Deval .................. H04L 1/22 |
| | | 370/254 |
| 2015/0271268 A1* | 9/2015 | Finkelstein ............ H04L 67/12 |
| | | 370/400 |
| 2015/0281054 A1 | 10/2015 | Utgikar et al. |
| 2015/0331635 A1 | 11/2015 | Ben-Shaul et al. |
| 2015/0350062 A1* | 12/2015 | Lindem, III ........... H04L 45/22 |
| | | 370/220 |
| 2016/0248858 A1 | 8/2016 | Qiu et al. |
| 2016/0277509 A1* | 9/2016 | Qiang .................... H04L 67/16 |
| 2016/0328252 A1 | 11/2016 | Singh et al. |

OTHER PUBLICATIONS

U.S. Office Action dated Mar. 29, 2017 cited in U.S. Appl. No. 14/807,728, 18 pgs.

U.S. Final Office Action dated Sep. 8, 2017 cited in U.S. Appl. No. 14/807,728, 18 pgs.

U.S. Office Action dated Apr. 30, 2018 in U.S. Appl. No. 14/807,728, 24 pgs.

* cited by examiner

VIRTUAL CABLE MODEM TERMINATION SYSTEM REDUNDANCY IN A CABLE MODEM NETWORK ENVIRONMENT

CROSS-REFERENCE TO RELATED APPLICATION

This application claims the benefit of priority under 35 U.S.C. § 119(e) to U.S. Provisional Patent Application Ser. No. 62/156,770, filed on May 4, 2015 and entitled "VIRTUAL CABLE MODEM TERMINATION SYSTEM MIGRATION AND REDUNDANCY," the disclosure of which is hereby incorporated by reference in its entirety.

TECHNICAL FIELD

This disclosure relates in general to the field of communications and, more particularly, to virtual Cable Modem Termination System (VCMTS) redundancy in a cable modem network environment.

BACKGROUND

Network functions virtualization (NFV) is a network architecture concept that uses information technology (IT) virtualization related technologies to virtualize network functions into building blocks that may be connected, or chained, to create communication services. NFV relies upon, but differs from, traditional server virtualization techniques such as those used in enterprise IT. A virtualized network function (VNF), may include one or more virtual machines running different software and processes, on top of industry standard high volume servers, switches and storage, or cloud computing infrastructure. For example, a virtualized session border controller function could be deployed to protect a network without typical cost and complexity of obtaining and installing physical units. Other examples of NFV include virtualized load balancers, firewalls, intrusion detection devices and WAN accelerators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example system and method for facilitating VCMTS redundancy in cable modem network environments is provided and includes spawning (e.g., creating, instantiating, producing, generating, making, etc.) a first instance (e.g., specific realization of a generic software object) of a virtual network function (VNF) (e.g., implementation of a network function on a virtual machine rather than on a physical specialized hardware) on a first server in a cable modem network (e.g., network that facilitates communication according to cable modem protocols such as Data Over Cable Service Interface Specification (DOCSIS)), spawning a second instance of the VNF on a different second server, configuring the second instance to be communicatively coupled to the first instance in a same subnet of the network, and synchronizing (e.g., copying, coordinating, matching, etc.) state between the first instance and the second instance. In specific embodiments, the VNF comprises a VCMTS.

Example Embodiments

Figure 1:
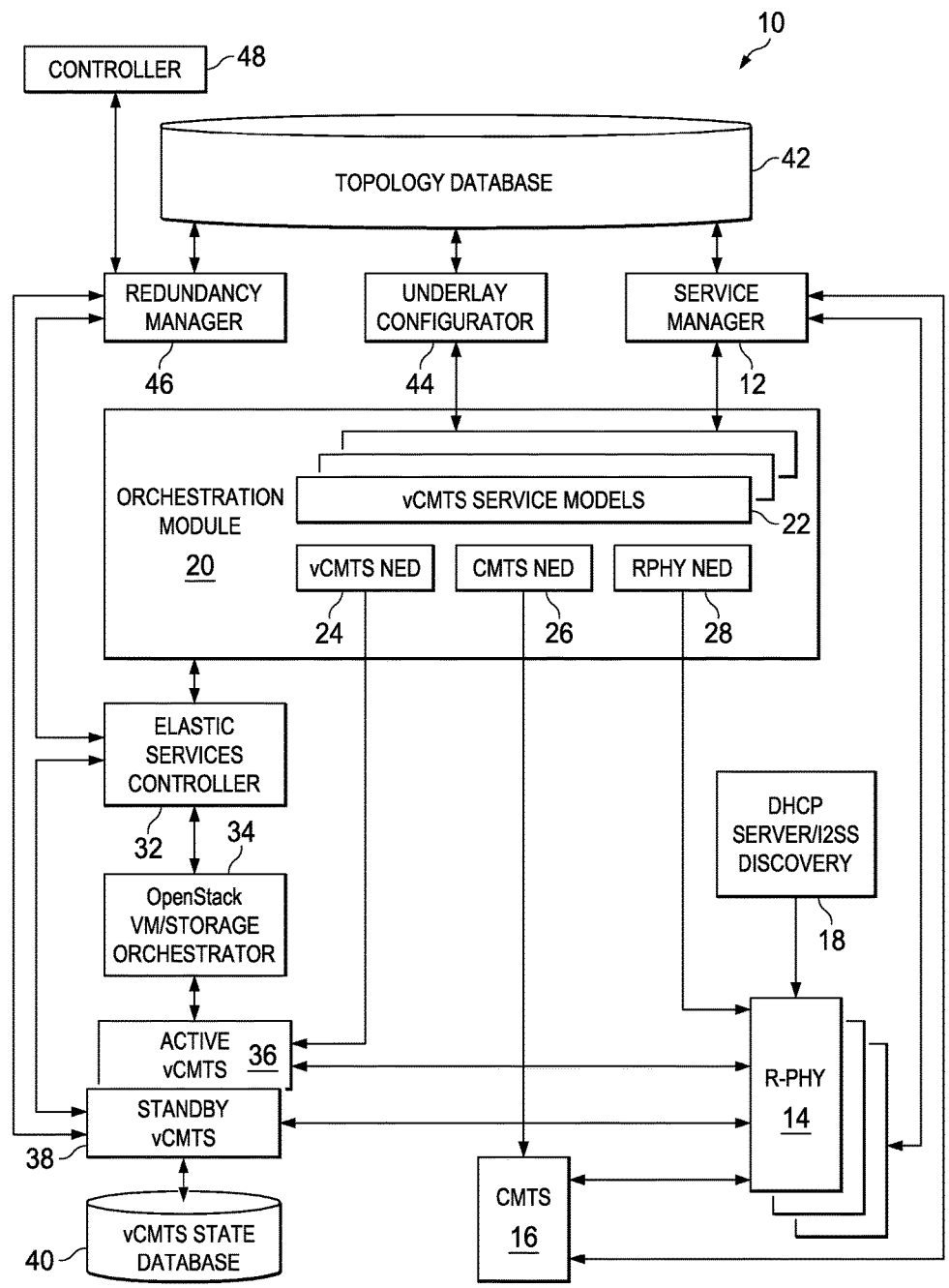
FIG. 1 is a simplified block diagram illustrating a communication system for VCMTS redundancy in a cable modem network environment.

Turning to FIG. 1, FIG. 1 is a simplified block diagram illustrating a communication system 10 for virtual cable modem termination system (VCMTS) redundancy in accordance with one example embodiment. Communication system 10 supports VCMTS-remote physical layer (R-PHY) network architecture. Communication system 10 includes a service manager 12, one or more R-PHY entity 14, and one or more cable modem termination system (CMTS) 16. A Dynamic Host Configuration Protocol (DHCP) server 18 communicates with R-PHY entity 14. Communication system 10 further includes an orchestration module 20 that comprises VCMTS service models 22, and various network element drivers (NEDs), such as VCMTS NED 24, CMTS NED 26 AND RPHY NED 28.

Orchestration module 20 communicates with an elastic services controller 32 coupled to an OpenStack™ (or any other type) of virtual machine (VM)/storage orchestrator 34, which can spawn an active VCMTS instance 36 and a standby VCMTS instance 38, which may communicate with a VCMTS state database (DB) 40. Communication system 10 further includes a topology database 42, an underlay configurator 44, and redundancy manager 46 and a controller 48.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Network function virtualization (NFV) decouples network functions from underlying hardware so they run as software images on commercial off-the-shelf and/or purpose-built hardware. Standard compute, network and storage virtualization technologies are typically used to virtualize the network functions. NFV can reduce dependence on dedicated, specialized physical devices by allocating and using physical and virtual resources only when and where needed. Service providers can thereby reduce overall costs by shifting more components to a common physical infrastructure and optimizing its use, allowing them to respond more dynamically to changing market demands by deploying new applications and services on an as-needed basis. Simple examples demonstrating the NFV concepts include a virtualized firewall or a load balancer. Instead of installing and operating a dedicated appliance to perform the network function, NFV allows service providers or network operators to simply load a software image of the corresponding network function on a VM on demand.

While NFV is applicable to any data plane packet and control plane function in mobile and fixed networks, currently, the concept is applied to switching elements (such as Layer 2 (L2) switches and Layer 3 (L3) routers), mobile network nodes (such as gateways, node e, etc.), tunneling gateway elements (e.g., virtual private network (VPN) gateways), traffic analysis (e.g., deep packet inspection), service assurance, test and diagnostics, converged and network wide functions (e.g., authentication, authorization, and accounting (AAA) server), application level optimization (e.g., load balancers), security services (e.g., firewall) and other such functions that deal with packet routing and processing.

NFV based network services typically require orchestration capabilities. Traditional orchestration, in a broader context of service fulfillment, includes coordinating and aligning business and operational processes in designing, creating, and delivering a specific network service. The orchestration process involves use and management of complex systems and tools such as order, inventory, and resource management systems; configuration and provisioning tools; and operating support systems (OSSs) combined with processes associated with these tools and systems. For example, a typical NFV orchestration system involves a virtual network function (VNF) manager that performs scalable, automated VNF lifecycle management, including creation, provisioning, and monitoring of VNFs.

Typically, orchestration uses principles of software defined networking (SDN), in which control plane processes are decoupled from the data plane and the underlying network infrastructure is abstracted for applications and network services. Typically, in the northbound direction, the SDN control plane provides a common abstracted view of the network to higher level applications and programs, typically using high-level web services-style APIs; in the southbound direction, the SDN control plane programs the forwarding behavior of physical network equipment distributed around the network with device-level protocols or APIs.

Cable modem networks cannot be completely redesigned based on SDN and NFV concepts due to the inherent nature of the network. For example, physical layer functionality (e.g., receiving quadrature amplitude modulated (QAM) signals from cable modems) cannot be virtualized and require dedicated hardware. However, some other network functions can be virtualized, and thus, cable modem networks can include a mix of network functions executing on dedicated hardware and VNFs executing in cloud data centers. For example, Cisco's cBR-8 broadband router supports dedicated hardware for R-PHY, and software supporting SDN and VCMTS in the network.

With virtualization of VCMTS functions, various components of a traditional Converged Cable Access Platform (CCAP) is implemented in a distributed manner in the network. Redundancy in such a distributed network can provide high availability, which may be desirable for a variety of business and technical reasons. High availability (HA) can be a requirement of a service provider network and HA solutions for storage and compute have been deployed for some time. HA is also a major concern when considering network function virtualization (NFV) for service provider networks. The cloud culture of "just spin a new Virtual Machine (VM)" in case of a software or hardware fault seems at odds with the 99.999% availability requirements for service providers. Unfortunately many data centers have suffered failures of several hours in recent years. In 2013, the Amazon cloud was down for 49 minutes exceeding its 99.995% claim. Google had a 4-hour outage in 2015. The assumption is that as technology matures, such catastrophic events would became rarer.

The data center world likes to categorize VMs into "cows" and "pets". Cows are VMs that do not need much care; if one fails another quickly takes over. There are many 'cows' in the data center network and an individual failure is not critical. 'Pets' are unique, relatively few and require care; if a 'pet' fails, it can be a big deal in the data center network. A typical "cow" would be a VM that load shares a task with other VMs, for example serving web pages. Recovery of a cow is fairly straightforward: in case of a software failure, the VM can be restarted and re-run; in case of a hardware failure, a replacement VM can be started on another server. The process for creating a new VM is substantially similar to recovering from a failure and any states (e.g., network states, such as hardware power, switch configuration, routing states, multi-switch tunneling, connectivity, connection states, firmware versions, software versions, IP address assignment, etc.) are not shared between the old and new VM, simplifying handling of failures.

On the other hand, NFVs fall under the "pet" category and have a few requirements for HA: (i) minimal packet loss: the role of an NFV VM is to process packets; therefore, in the case of failover packet loss must be minimal; because the total number of drops depends on the failure detection time and recovery time, it can be difficult to guarantee a zero packet loss; (ii) stateful recovery: many NFVs require state (e.g., a virtual CMTS keeps track of E.911 calls); in case of a failure, the states are be carried over to the new VM.

A typical solution for achieving high availability that meets the minimal packet loss and stateful recovery requirements is by means of redundancy; one VM is "active" and the other VM is "standby"—essentially the same solution used in the physical world but with one big difference—in the physical world, the redundancy is typically intra-box and the implementation details are completely hidden from the user. In contrast, the components of a virtualized redundancy solution are visible and fully automated.

Communication system 10 is configured to address VCMTS redundancy issues (among others) in a cable modem network environment. In an example embodiment, an entire instance of VCMTS is made redundant to ensure high availability. Whereas the physical CCAP used N+1 redundancy for line cards (e.g., 1 standby line card backing up N active line cards) and 1:1 for supervisor cards, the VCMTS network architecture breaks the traditional CCAP redundancy model because it has no redundant line cards or supervisor cards.

Various possible redundancy models may be implemented in different embodiments. Note that in any redundancy model described herein, VCMTS instances (and other network function virtualization modules) may be emulated with VMs in different modes: (i) active/active: two separate instances share the traffic; if one fails, capacity is halved but selected services can be prioritized and handled over the reduced capacity (e.g., in physical CMTS 16, active/active redundancy is implemented using two supervisor cards); (ii) active/standby (1+1): as opposed to active/active, the standby component carries no traffic and in case of a failure it assumes the identity of the failed card; active/standby (N+1): in CMTS 16, the line cards are relatively expensive and to reduce the cost of high availability several line cards are backed up by a single line card. Other redundancy models include: N+M: a group of N active instances are backed up by M standby; N-to-1: Similar to N+1 but the backup entity switches back to the primary instance after recovery; N-to-N: combine the concepts of N+M and active/active so that each element has some extra capacity to cover for a failure but no specific element is designated as standby or active.

According to various embodiments, during operation, service manager 12 receives notification that R-PHY entity 14 has been powered on in the network. In a general sense, service manager 12 acts as a resource manager managing the configuration information, life cycle and location of physical resources such as R-PHY entity 14 and physical CMTS 16. In various embodiments, service manager 12 determines that CMTS 16 with particular configuration settings may be used with the powered on R-PHY entity 14 to generate an appropriate CCAP for cable modem transmissions. The particular configuration settings of CMTS 16 may be dependent on signal transmission qualities between R-PHY entity 14 and various cable modems, and other factors. Service manager 12 assigns IP addresses in the network, including management IP address for vCMTS instances in some embodiments and IP tunnel endpoints for tunnels. If service manager 12 does not assign an IP address thereto, R-PHY entity 14 may communicate with DHCP server 18 and obtain a network address therefrom.

Service manager 12 maintains policies to set up one or more VCMTS instances. Service manager 12 triggers orchestration module 20 to create a new VCMTS. Orchestration module 20 may generate, extract, or otherwise access the particular configuration settings of desired CMTS 16 in VCMTS service models 22. In some embodiments, VCMTS service models 22 may comprise YANG data models that include different configuration settings for CMTS 16. In a general sense, VCMTS services and devices are modeled, for example, using YANG data models, and their configuration settings are centrally stored in orchestration module 20 as VCMTS service models 22. The configuration settings may include, by way of examples and not as limitations, Day 0 configuration settings that enable building a specific VCMTS instance; Day 1 configuration settings that enable providing network connectivity to the specific VCMTS instance (e.g., Day 1 configuration settings may include time synchronization between VCMTS and R-PHY, etc.); and Day 2 configuration settings that provision the specific VCMTS instance with various services, optimizations, and other parameters that enable particular functionalities in the network.

The configuration settings of the various service and device models are applied to the appropriate devices using corresponding NEDs, such as VCMTS NED 24, CMTS NED 26 AND RPHY NED 28. Orchestration module 20 also makes device configuration commands available over a network-wide, multivendor command line interface (CLI), application programming interfaces (APIs), and user interfaces using the various NEDs, such as VCMTS NED 24, CMTS NED 26 AND RPHY NED 28. In various embodiments, VCMTS NED 24, CMTS NED 26 AND RPHY NED 28 together comprise a network-facing part of orchestration module 20. They may communicate over any native protocol supported by the respective network elements, such as Network Configuration Protocol (NETCONF), Representational State Transfer (REST), Extensible Markup Language (XML), CLI, and Simple Network Management Protocol (SNMP).

An elastic services controller 32 may obtain instructions from orchestration module 20 to generate a VCMTS instance with certain Day 0 configuration settings, for example, corresponding to CMTS 16. An OpenStack™ (or any other type) of virtual machine (VM)/storage orchestrator 34 may initiate an active VCMTS instance 36 with the specified Day 0 configuration settings. Orchestration module 20 may inform service manager 12 about spawning of active VCMTS instance 36. Service manager 12 may store the topology information in topology DB 42.

Underlay configurator 44 may provide VCMTS NED 24 and may RPHY NED 28 with appropriate Day 1 configuration settings that enable creation of a communication tunnel (e.g., communication channel using an overlay/encapsulation network) between active VCMTS instance 36 and R-PHY entity 14. In a general sense, underlay configurator 44 manages configuration of communication tunnels between R-HY entity 14 and any VCMTS instances and/or CMTS 16. The IP addresses for the tunnel endpoints are selected by service manager 12. Underlay configurator 44 pushes down the configuration to create the tunnel. In addition, underlay configurator 44 assures sufficient bandwidth for the tunnel from the VCMTS instances to the network gateway.

Underlay configurator 44 also configures various network elements (both virtual and physical) to direct downstream packets to the proper VCMTS instance. In some embodiments, the vCMTS instances can act as standalone nodes in respective network paths. In such cases, underlay configurator 44 ensures that packets are routed to the VCMTS instances appropriately. In other embodiments, the VCMTS instances comprise end of service chains. In such cases, underlay configurator 44 ensures that packets are routed to the beginning of respective service chains.

VCMTS NED 24 may configure active VCMTS instance 36 with appropriate Day 1 configuration settings. RPHY NED 28 may configure R-PHY entity 14 with appropriate Day 1 configuration settings that enable it to communicate with active VCMTS instance 36. Redundancy manager 46 may allow active VCMTS 36 to own a quorum token. Communication between active VCMTS instance 36 and R-PHY entity 14 may involve various changes to configuration settings and communication parameters (e.g., channels, carrier-to-noise ratio, signal-to-noise ratio, modulation error ratio, etc.); such changes, including the underlying configuration settings may be comprised in a "state" of active VCMTS instance 36.

The state, including Day 0 and Day 1 configuration settings of active VCMTS instance 36 may be stored in external (i.e., to the VCMTS instance) VCMTS state database 40. In some embodiments, redundancy manager 46 lookups topology database 42 and sends a trigger to elastic services controller 32 to create standby VCMTS instance 38. In other embodiments, redundancy manager 46 lookups VCMTS state database 40 and sends a trigger to elastic services controller 32 to create standby VCMTS instance 38. In yet other embodiments, the change in VCMTS state database 40 may trigger elastic services controller 32 to generate standby VCMTS instance 38 with substantially identical configuration settings as active VCMTS instance 36. Standby VCMTS 38 may form a communication tunnel with R-PHY entity 14 and active VCMTS instance 36.

Underlay configurator 44 may create a communication tunnel between active VCMTS instance 36 and standby VCMTS instance 38. The communication tunnel may facilitate minimal disruption in packet flows when a switchover occurs. Keepalive messages (e.g., heartbeats) and state may be also be communicated between active VCMTS instance 36 and standby VCMTS instance 38 in the communication tunnel between them, for example, to synchronize state between them. In some embodiments, the communication tunnel between active VCMTS instance 36 and standby VCMTS instance 38 may be equivalent to creating a tenant virtual network where the instances and their backhaul are in a single network domain.

In various embodiments, active VCMTS instance 36 and standby VCMTS instance 38 may include an active-active control plane, and active-standby data plane. As used herein, the term "control plane" refers to network routing (e.g., setting up the network) and network management (e.g., configuration) functions; the term "data plane" refers to network data communication functions. For example, management messages including configuration settings may be communicated and/or updated in both active VCMTS instance 36 and standby VCMTS instance 38; however, only active VCMTS 36 (which owns the quorum token) may send and receive data messages until failure, upon which standby VCMTS instance 38 may take over the quorum token (e.g., facilitated by redundancy manager 46) and send and receive data messages.

Because standby VCMTS instance 38 is not active in the data plane when active VCMTS instance 36 is operational, standby VCMTS instance 38 does not take much server resources and therefore many virtual standby VCMTS instances can be hosted on a fraction of the servers used to host the active VCMTS instances. In some embodiments, N+1 can be emulated by having N instances of VCMTS that are on dedicated servers all backed up by a single server, for example, based on an assumption that N is small enough so that two active VCMTS instances failing simultaneously would be unlikely.

Further, N can comprise a customer tunable knob, depending on how frequently failures are experienced on the VMs executing the VCMTS instances. Customers can also tune N dynamically based on a calendar; for example, during important events (such as Superbowl) N could be low, to provide higher fault resilience at the cost of more back up servers. For business services, N could be lower than for residential services, thereby providing a higher service level guarantee to business subscribers. Note that such flexible and tunable redundancy mechanisms cannot be provided in a cost-effective manner with dedicated hardware. On the other hand, the software-based VCMTS approach can greatly simplify the redundancy mechanism. Instead of managing N+1 redundancy instances, a collection of 1:1 redundant instances over-subscribed on a back-up server may be managed to derive scalable value.

Further, in embodiments where the VCMTS state is stored in external VCMTS state database 40, existing data center infrastructure (including high availability mechanisms) can inherently provide redundancy of the database, allowing a single VCMTS instance to have multiple backups. For example, one backup instance may be implemented locally to protect from software crashes; another backup instance may be implemented in a remote data center to cover for hardware failures or entire data canter catastrophic events.

In various embodiments, VCMTS state database 40 does not merely store static state. VCMTS state database 40 comprises a transitional store between VMs, which are running hot and synchronous, with one VM (e.g., executing active VCMTS instance 36) acting as a source of data and the VMs (e.g., executing standby VCMTS instances) acting as sinks. Also, VCMTS state database 40 is live and dynamic with real-time information about modem states, service flows, voice sessions, IP video over Data-Over-Cable-Service-Interface Specification (DOCSIS) and subscribers.

In various embodiments, the redundancy mechanism extends over communication tunnels. For example, both active VCMTS instance 36 and standby VCMTS instance 38 are connected to R-PHY entity 14 over communication tunnels, although only one tunnel is actively communicating data and the other communication tunnel acts as a standby. Such a pre-provisioned redundancy mechanism saves having to calculate paths on the fly. Various embodiments of communication system 10 allows scalable disaster recovery, where a single instance of VCMTS state database 40 is replicated to an alternate datacenter or another network. Disaster recovery VMs may be deployed at even higher over provisioning levels for cost effectiveness.

During any failure event, redundancy manager 46 handles switchover from active VCMTS instance 36 to standby VCMTS instance 38. In some embodiments, redundancy manager 46 determines whether to switchover. In some embodiments, redundancy manager 46 deletes the previously active VCMTS instance 36 when any replacement VCMTS instance is generated. In some embodiments, generation and deletion of VCMTS instances is performed by elastic services controller 32 based on instructions from redundancy manager 46 (either directly, through orchestration module 20, or through service manager 12). In some embodiments, redundancy manager 46 communicates with controller 48 to inject routes when VCMTS failovers occur. Redundancy manager 46 informs other network elements, such as service manager 12 and controller 48 when the failure event is over.

Turning to the infrastructure of communication system, the cable modem network can include any number of cable modems, customer premises equipment, servers, switches (including distributed virtual switches), routers, and other nodes inter-connected to form a large and complex network that supports cable modem protocols such as Data Over Cable Service Interface Specification (DOCSIS). In particular, the cable modem network comprises cable modems distributed in various geographic locations, communicatively coupled over radio frequency communication to one or more R-PHY entity 14, which in turn communicates with CMTS 16 and/or VCMTS instances (e.g., active VCMTS instance 36 and/or standby VCMTS instance 38).

In a general sense, the network also represents a series of points or nodes of interconnected communication paths for receiving and transmitting packets and/or frames of information that are delivered to the communication system. A node may be any electronic device, computer, printer, hard disk drive, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

The network offers a communicative interface between cable modem network components, and may include any local area network (LAN), wireless local area network (WLAN), metropolitan area network (MAN), Intranet, Internet, Extranet, wide area network (WAN), virtual private network (VPN), or any other appropriate architecture or system that facilitates communications in a network environment. Network 11 may implement any suitable communication protocol for transmitting and receiving data packets within the communication system. The architecture of the present disclosure may include a configuration capable of TCP/IP, TDMA, and/or other communications for the electronic transmission or reception information in a network. The architecture of the present disclosure may also operate in conjunction with any suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of the communication system. It should be understood that the communication system shown in FIG. 1 is simplified for ease of illustration.

In some embodiments, a communication link may represent any electronic link supporting a network environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In particular embodiments, the VCMTS instances (e.g., active VCMTS instance 36 and/or standby VCMTS instance 38) may comprise a software application executing on a specialized hardware appliance (e.g., suitably configured server) with appropriate ports, processors, memory elements, interfaces, and other electrical and electronic components that facilitate the functions described herein. In some embodiments, the various modules in the VCMTS instances (e.g., active VCMTS instance 36 and/or standby VCMTS instance 38) may execute on separate hardware devices and/or comprise software applications or combination thereof that perform the operations described herein.

R-PHY entity 14 may comprise suitable hardware components and interfaces for facilitating the operations described herein. In some embodiments, R-PHY entity 14 may be embedded in or be part of another hardware component, such as a broadband processing engine (comprising a motherboard, microprocessors and other hardware components). In some embodiments, the R-PHY entity comprises downstream and upstream PHY, deployed in a Coaxial Media Converter (CMC) that supports RF functions at the PHY layer.

Note that is some embodiments, VCMTS instances (e.g., active VCMTS instance 36 and/or standby VCMTS instance 38) and R-PHY entity 14 may be located in a same chassis; in other embodiments, the VCMTS instances (e.g., active VCMTS instance 36 and/or standby VCMTS instance 38) and R-PHY entity 14 may be located in different physical locations, remote from each other and coupled over a Layer 2 or Layer 3 network with various other network elements, such as switches and routers intervening there between.

Note that the cable modem network can include any number of VCMTS instances, each VCMTS instance connected to a plurality of R-PHY entities, each of which is connected to multiple cable modems (CMs) within the broad scope of the embodiments. The VCMTS instance and R-PHY entity together comprise a Converged Cable Access Platform (CCAP), which is typically a combination of a DOCSIS CMTS and an edge QAM (EQAM). Note that each VCMTS may comprise a virtual instance of a CMTS, configured with appropriate functionalities, configuration settings, and network interfaces to emulate the physical CMTS.

The physical CMTS 16 may provide one or more network functions (e.g., a network function comprises a building block within an operator's network infrastructure with well-defined external interfaces and well-defined functional behavior). The VCMTS instances may also provide the exact same network functions as the equivalent CMTS 16, except that they are deployed in a virtualized environment. VCMTS and R-PHY entity can communicate over a converged interconnect network (CIN) that can span across different geographic locations in some embodiments; in other embodiments, the CIN may comprise a set of interfaces within the same chassis. The network may also include a one or more CMTS connected to the R-PHY entities.

Figure 2:
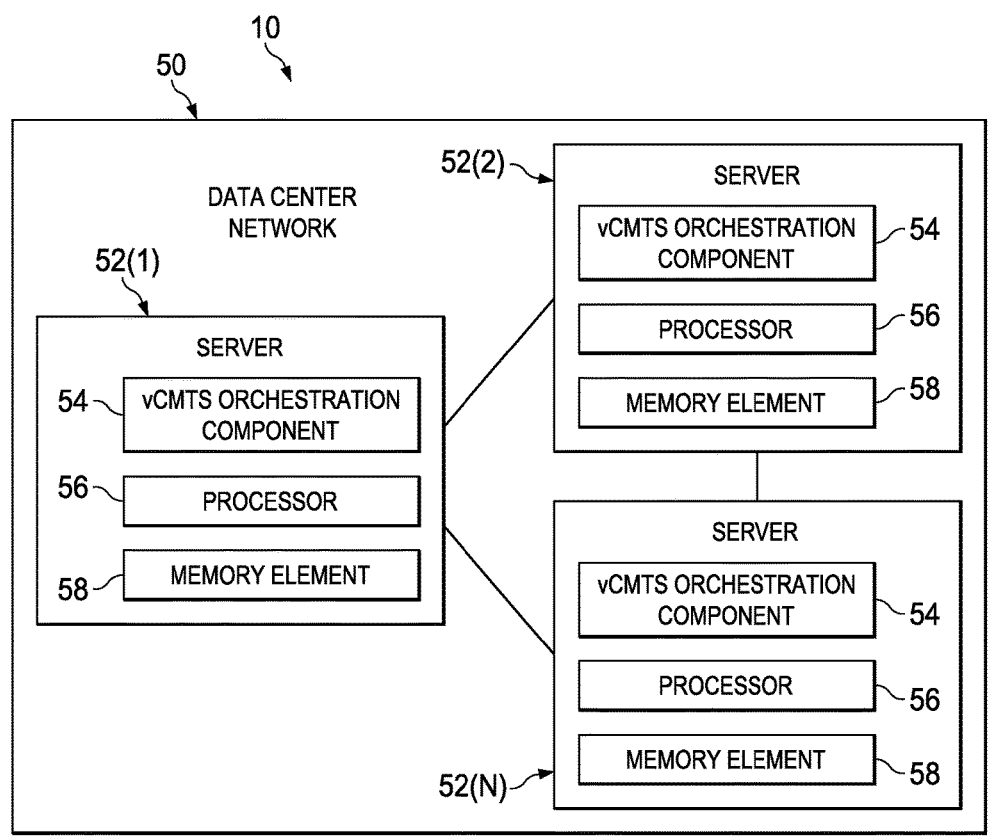
FIG. 2 is a simplified block diagram illustrating example details of embodiments of the communication system.

Turning to FIG. 2, FIG. 2 is a simplified block diagram illustrating an example implementation of communication system 10. A data center network 50 may comprise a plurality of interconnected servers 52(1)-52(N), each including its own separate processor 56 and memory element 58. In some embodiments, each server 52(1)-52(N) may be deployed on separate blades of a server rack; in other embodiments, each server 52(1)-52(N) may be identified by separate network addresses, but may execute in the same server blade. Each server 52(1)-52(N) may host one or more VCMTS orchestration component 54. VCMTS orchestration component 54 may comprise, by way of examples and not as limitations, orchestration module 20, DHCP server 18, elastic services controller 28, redundancy manager 48, and VCMTS state database 40. For example, orchestration module 20 may execute in server 52(1); elastic services controller 32 may execute in server 52(2), and active VCMTS instance 36 may execute in server 52(N). Note that such an implementation facilitates a distributed execution of communication system 10 in data center network 50.

Figure 3:
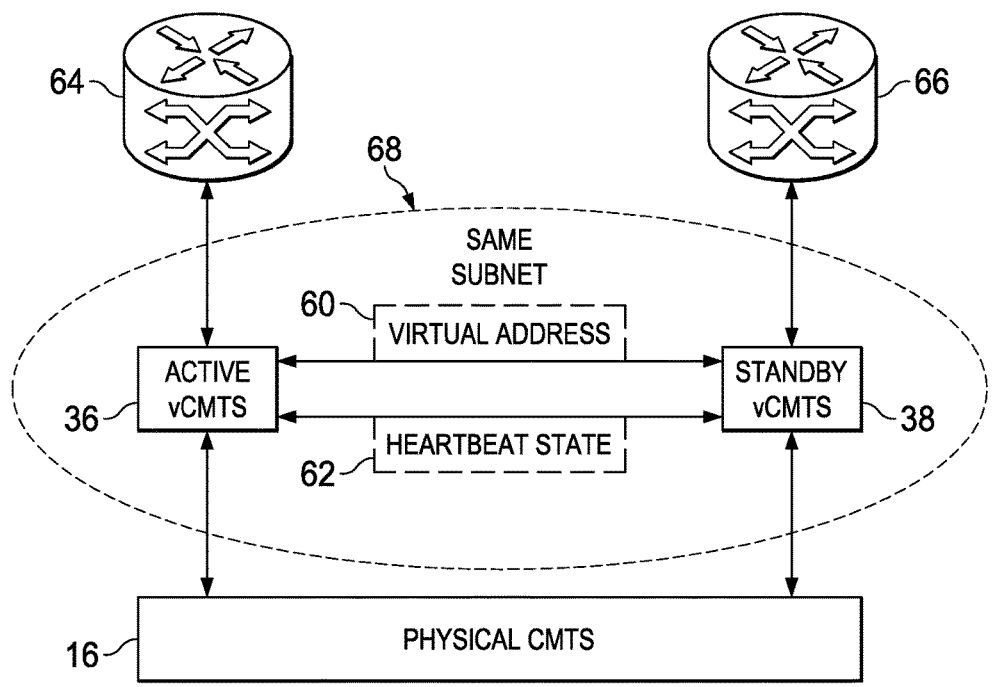
FIG. 3 is a simplified block diagram illustrating other example details of embodiments of the communication system.

Turning to FIG. 3, FIG. 3 is a simplified block diagram illustrating VCMTS redundancy according to an example embodiment. Physical CMTS 16 is emulated with active VCMTS 36 and standby VCMTS 38 providing extra services. Both active VCMTS instance 36 and standby VCMTS instance 38 have same virtual address 60 to the outside world, share state and heartbeat messages 62, and are connected to redundant routers 64 and 66. In some embodiments, state and heartbeat messages 62 are communicated at pre-determined intervals, with state information as of a time of transmission from active VCMTS instance 36.

The implementation can be executed in active/standby mode with only one network path actively carrying data at any instant of time. A switchover from active VCMTS instance 36 to standby VCMTS instance 38 may be transparent to the rest of the network. In various embodiments, state and heartbeat messages 62 can facilitate detecting failure of either instance, for example, to assist in making a switchover decision; a failure of state and heartbeat messages 62 does not necessarily or automatically cause a switchover.

The term "cluster" is typically used in relation to data centers to describe a group of servers that appear as a single entity to the outside world (e.g., an e-mail server) and "HA cluster" for a solution that includes availability. In NFV, according to various embodiments, virtual instances of CMTS 16 may be implemented as a single VM, with a cluster comprising both active VCMTS instance 36 and standby VCMTS instance 38. The cluster that both active VCMTS instance 36 and standby VCMTS instance 38 belong to is a single L2 domain, or subnet 68 from a networking point of view. As used herein, the term "subnet" refers a portion of a network on an L2 domain (e.g., virtual local area network (VLAN) according to 802.1Q standard, virtual extensible local area network (VXLAN), Network Virtualization using Generic Routing Encapsulation (NVGRE), etc.) within a L3 network, or alternatively, an L3 partition in the L3 network. In some embodiments, a one-to-one correspondence may exist between a VLAN and a subnet (e.g., if a host is in a given IP subnet, it is also in a given VLAN, and vice-versa.) In a general sense, an L2 domain comprises a set of nodes and links interconnected without passing through some sort of L3 forwarding function.

Even with geo-redundancy, where active VCMTS instance 36 and standby VCMTS instance 38 are in physically distributed data centers, the instances are connected with an overlay (e.g., a tunnel) that would make them appear as belonging to the same subnet 68. In various embodiments, orchestration module 20 creates the overlay as part of a complete setup and life-cycle management of active VCMTS instance 36 and standby VCMTS instance 38.

Note that in some cases, such as geo-redundancy, the redundant path may not be as optimal as the active path. For example, the redundant VM may be intentionally placed in a data center further away from physical CMTS 16. In such embodiments, an N-to-1 model may work better than other redundancy models, because after a fault is resolved, control can be returned to the previously active instance as opposed to leaving the recovered VM as a "standby".

Figure 4:
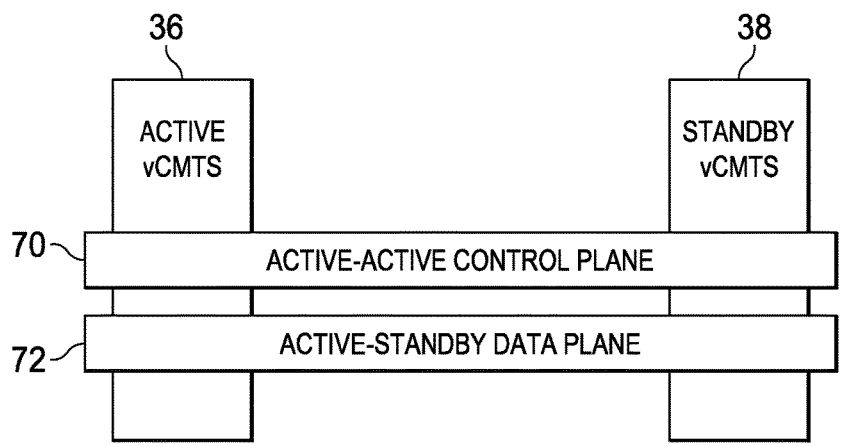
FIG. 4 is a simplified block diagram illustrating yet other example details of embodiments of the communication system.

Turning to FIG. 4, FIG. 4 is a simplified block diagram illustrating example details of an embodiment of communication system 10. Active VCMTS instance 36 and standby VCMTS instance 38 may share an active-active control plane 70, and an active/standby data plane 72. In some embodiments, both active VCMTS instance 36 and standby VCMTS instance 38 may be actively managed by orchestration module 20, with state, including configuration settings being updated at both instances. In another example embodiment, orchestration module 20 may update state, including configuration settings of only active VCMTS instance 36; the updated state may be pushed to VCMTS state database 40. The update of VCMTS state database 40 may automatically trigger an update of corresponding state at standby VCMTS instance 38.

However, the data traffic may flow through only one of active VCMTS instance 36 or standby VCMTS instance 38 at any instant of time. For example, in a default mode, upstream and downstream traffic may flow through active VCMTS instance 36. Upon failure of active VCMTS instance 36, redundancy manager 46 may cause traffic switchover to standby VCMTS instance 38.

Figure 5:
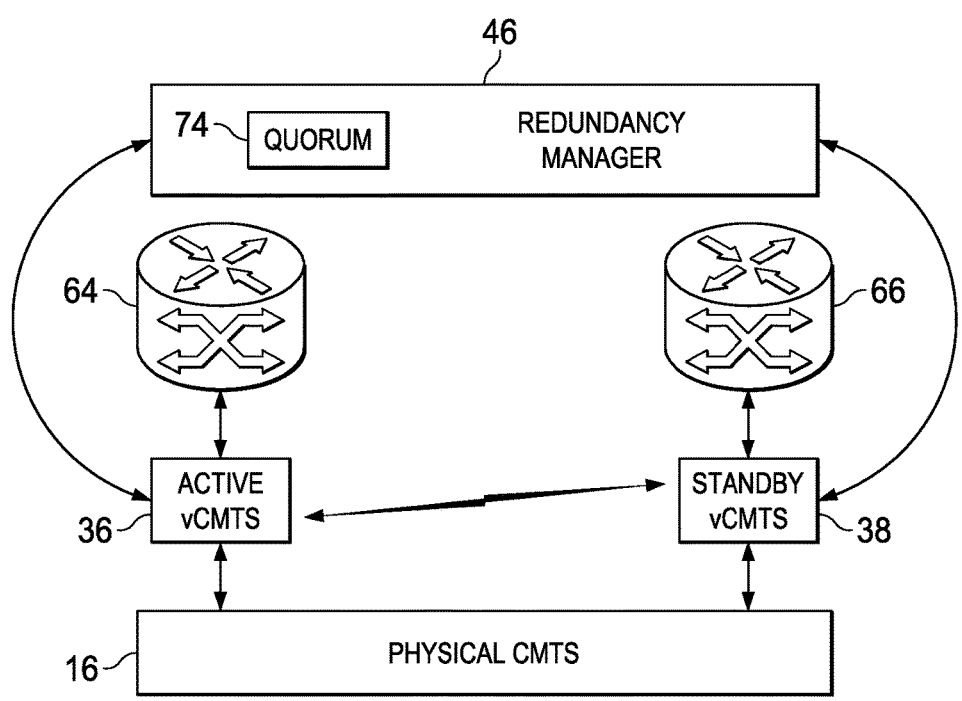
FIG. 5 is a simplified block diagram illustrating yet other example details of embodiments of the communication system.

Turning to FIG. 5, FIG. 5 illustrates example details of an example embodiment of a redundant VCMTS system. In a general sense, when two VMs try to decide which one is active there might be situations where both become active. For example, when the link used for heartbeat check fails, the originally active VM stays up and the standby VM assumes that the active is down (e.g., because the heartbeat stopped) and becomes active as well. When redundancy is managed within a single physical chassis (box) (either 1:1 or N+1), the box management handles the ambiguity internally. Furthermore, in a traditional appliance, the heartbeat is carried over a highly reliable internal path, which is not likely to fail in the first place.

In various embodiments, any active instance of VCMTS may "own" a quorum token 74. For example, standby VCMTS instance 38 would try to acquire quorum token 74 from redundancy manager 46 but would not succeed (because active VCMTS instance 36 still owns it) and therefore it will stay in standby mode. When active VCMTS instance 36 is down, redundancy manager 46 detects the failure, for example, because quorum token 74 becomes free. Thereafter, when standby VCMTS instance 38 tries to acquire quorum token 74, redundancy manager 46 would allow the change in ownership, and standby VCMTS instance 38 switches to active mode for data traffic.

Figure 6:
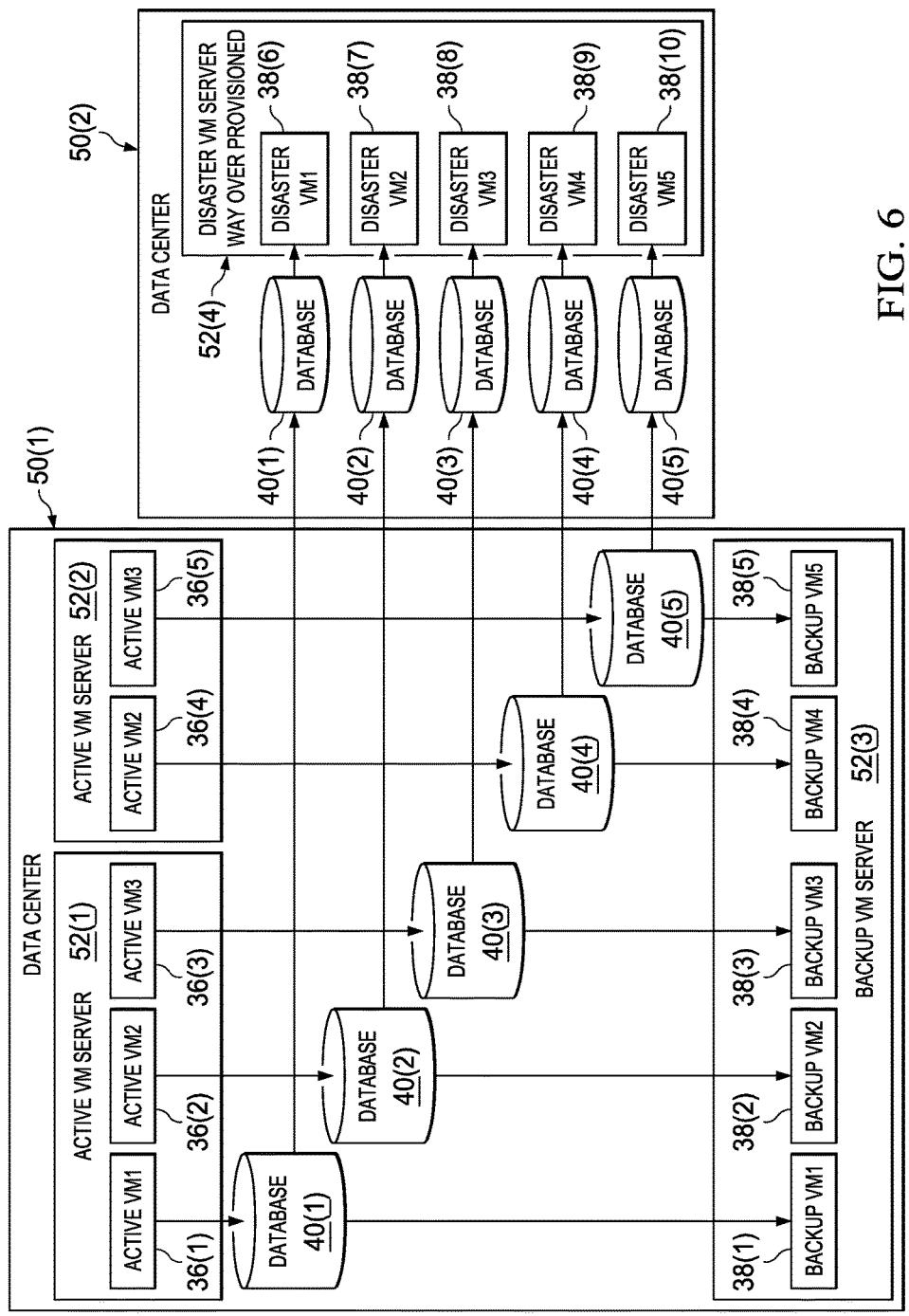
FIG. 6 is a simplified block diagram illustrating yet other example details of embodiments of the communication system.

Turning to FIG. 6, FIG. 6 is a simplified block diagram illustrating example details of a communication system 10 according to an example embodiment. According to an example embodiment, a plurality of active VCMTS instances, for example, 36(1)-36(3) may be provisioned on an active VM server 52(1) in data center network 50(1). Another plurality of active VCMTS instances, for example, 36(4)-36(5) may be provisioned in another active VM server 52(2). Each active VCMTS instance 36(1)-36(5) may store its respective state in VCMTS state database 40(1)-40(5). Each VCMTS state database 40(1)-40(5) may represent a separate logical instance of a physical database in some embodiments. Each active VCMTS instance 36(1)-36(5) may correspond to standby (e.g., backup, redundant) VCMTS instance 38(1)-38(5) over-provisioned on a single backup server 52(3). Each active/standby VCMTS pair may own a separate logical instance of VCMTS database 40. For example, active VCMTS instance 36(1) and standby VCMTS instance 38 may own VCMTS state database 40(1), and so on.

In some embodiments, each VCMTS state database instance 40(1)-40(5) may be replicated in data center network 50(2). Further, each active VCMTS instance 36(1)-36(5) may be backed up by another set of respective standby VCMTS instances 38(6)-38(10) (e.g., disaster VMs, for example, called upon if data center network 50(1) experiences catastrophic failures) provisioned on disaster VM server 52(4). Data center network 50(2) may be geographically separated and remote from data center network 50(1) in some embodiments.

During operation, assume that active VCMTS instance 36(1) fails, for example, due to a software crash of the VM executing the specific instance. Thereupon, traffic may be seamlessly and transparently switched over to standby VCMTS instance 38(1) executing in backup server 52(3). In another example, assume that active VM server 52(1) fails, for example, due to a hardware crash (e.g., processor experiences catastrophic failure). The hardware failure may cause active VCMTS instances 36(1)-36(3) to fail substantially simultaneously. Therefore, traffic may be seamlessly and transparently switched over to respective standby VCMTS instances 38(1)-38(3) executing in backup server 52(3). In yet another example, assume that data center network 50(1) experiences a catastrophic failure (e.g., a power outage). Thereupon, traffic may be seamlessly and transparently switched over to standby VCMTS instances 38(6)-38(10) executing in disaster server 52(4) in separate data center network 50(2).

Figure 7:
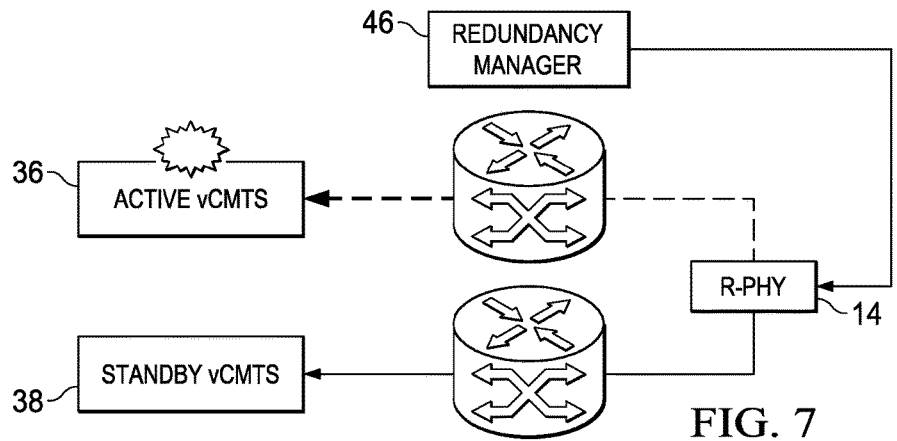
FIG. 7 is a simplified block diagram illustrating yet other example details of embodiments of the communication system.

Turning to FIG. 7, FIG. 7 is a simplified block diagram illustrating an example failover scenario for upstream traffic according to an example embodiment of communication system 10. Upstream traffic (e.g., traffic from R-PHY entity 14 to CMTS 16) may be sent to active VCMTS instance 36 in a default mode over appropriate CIN communication tunnels. In the default mode, no traffic may be sent over the communication tunnel with standby VCMTS instance 38. Assume that active VCMTS instance 36 experiences a failure. Redundancy manager 46 detects the failure and instructs R-PHY entity 14 to switch to the communication tunnel with standby VCMTS instance 38. Thereafter, R-PHY entity 14 sends upstream traffic to standby VCMTS instance 38.

Figure 8:
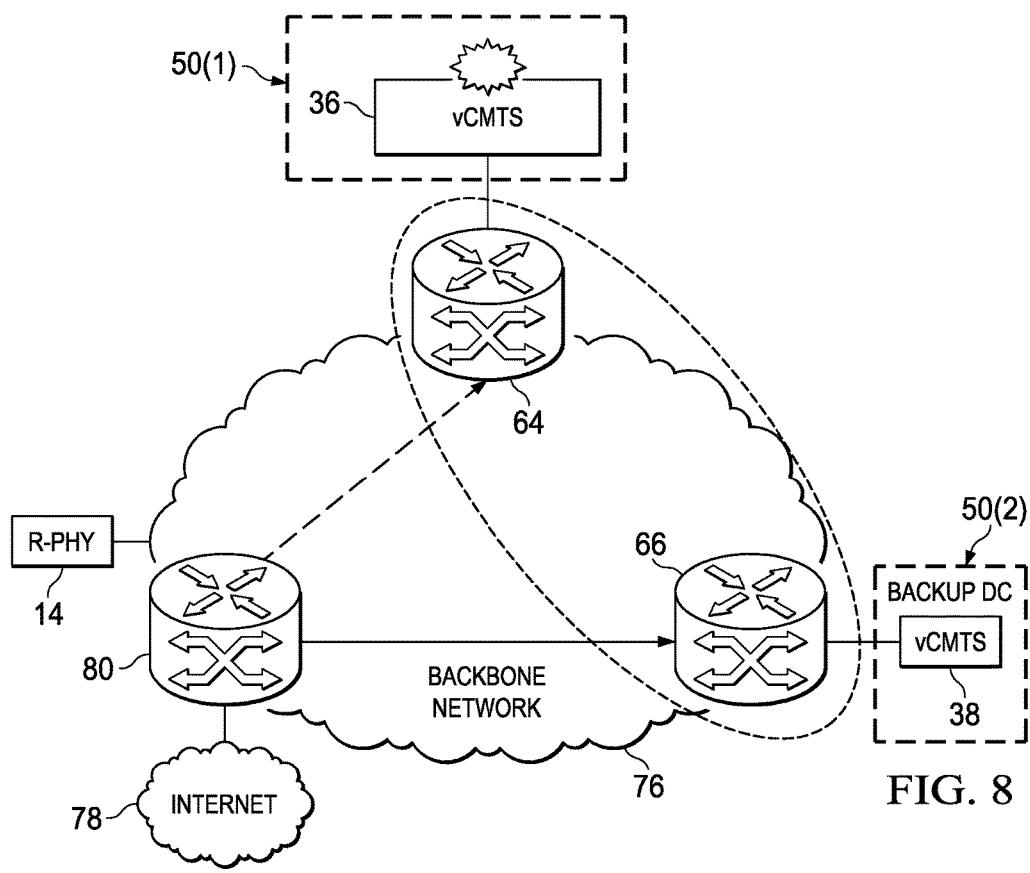
FIG. 8 is a simplified block diagram illustrating yet other example details of embodiments of the communication system.

Turning to FIG. 8, FIG. 8 is a simplified block diagram illustrating an example failover scenario for downstream traffic according to an example embodiment of communication system 10. Downstream traffic may be communicated to active VCMTS instance 36 over a backbone network 76 through Internet 78 (or other wide area network). Note that backbone network 76 comprises a part of computer network infrastructure that interconnects various pieces of network, such as data center network 50(1) and data center network 50(2), providing a path for the exchange of information between the various interconnected pieces. For example, downstream traffic may comprise subscription information, video and audio data, etc., which is generally transmitted (after receipt over backbone network 76) by active VCMTS instance 36 to R-PHY 14 and from there to various cable modems.

Assume, merely for example purposes and not as a limitation, that active VCMTS instance 36 is implemented in data center network 50(1), and standby VCMTS instance 38 is implemented in backup data center network 50(2). In a default mode, for example, when active VCMTS instance 36 is active, downstream traffic from Internet 78 is routed over backbone network 76 to router 64 of data center network 50(1), and therefrom to active VCMTS instance 36. Assume that active VCMTS instance 36 fails. Thereupon orchestration module 20 reprograms backbone network 76 (e.g., by configuring gateway router 80) to route packets destined to active VCMTS instance 36 to router 66 corresponding to data center network 50(2). Thereafter, packets received from Internet 78 are routed seamlessly and transparently to router 66 and on to standby VCMTS instance 38 executing in backup data center network 50(2). Thereafter, standby VCMTS instance 38 transmits the downstream data to R-PHY entity 14 for distribution to various cable modems.

Figure 9:
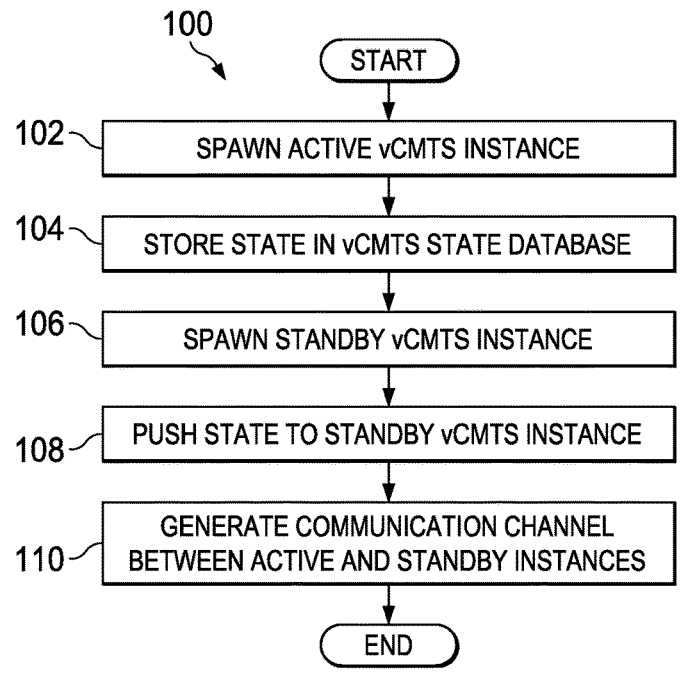
FIG. 9 is a simplified flow diagram illustrating example operations that may be associated with an embodiment of the communication system.

Turning to FIG. 9, FIG. 9 is a simplified flow diagram illustrating example operations 100 that may be associated with an embodiment of communication system 10. At 102, communication system 10 may spawn (e.g., create, generate, instantiate, etc.) active VCMTS instance 36. At 104, the state (e.g., power level, frequency, modulation, coding, multiplexing, and contention control, radio frequency communication paths, subscribers, etc.) of active VCMTS instance 36 may be stored in VCMTS state database 40. At 106, standby VCMTS instance 38 may be spawned. At 108, the state stored in VCMTS state database 40 may be pushed to standby VCMTS instance 38 so that it is substantially identical to active VCMTS instance 36 in operation. At 110, a communication channel is generated between active VCMTS instance 36 and standby VCMTS instance 38. The communication channel may be used to send periodic keepalive messages, such as state and heartbeat messages 62.

Figure 10:
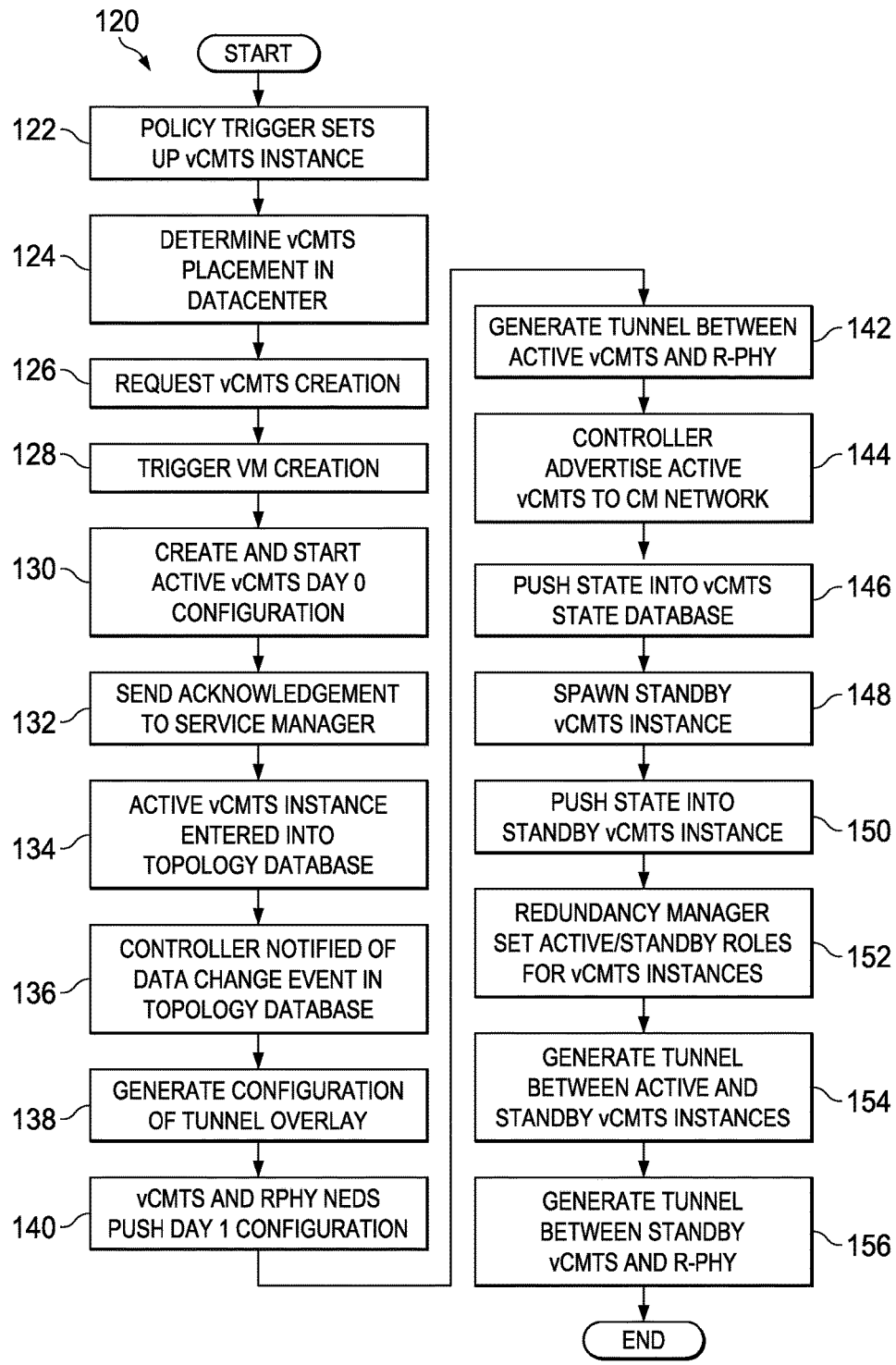
FIG. 10 is a simplified flow diagram illustrating other example operations that may be associated with an embodiment of the communication system.

Turning to FIG. 10, FIG. 10 is a simplified flow diagram illustrating example operations 120 that may be associated with an embodiment of communication system 10. At 122, a policy trigger (or other suitable mechanism) triggers set up of active VCMTS instance 36. At 124, service manager 12 may determine a placement of active VCMTS instance 36 in the network. For example, service manager 12 may determine a proximity of servers to physical CMTS 16, and choose a specific server closest to CMTS 16 to locate active VCMTS instance 36.

At 126, orchestration module 20 may request elastic services controller 32 to create active VCMTS instance 36 with particular device characteristics that emulate physical CMTS 16. The characteristics may be based on configuration settings from VCMTS service models 22. At 128, elastic services controller 32 may trigger VM creation at OpenStack VM/Storage orchestrator 34. At 130, OpenStack VM/Storage orchestrator 34 may create and start active VCMTS instance 36 with Day 0 configuration. At 132, orchestration module 20 may send an acknowledgement to service manager 12 that active VCMTS instance 36 has been created. Service manager 12 enters active VCMTS instance 36 and corresponding topology into topology database 42.

At 136, controller 48 may be notified of the topology change due to active VCMTS instance 36. At 138, underlay configurator 44 may generate a configuration of the tunnel overlay between active VCMTS instance 36 and R-PHY entity 14. At 140, VCMTS NED 24 and RPHY NED 28 push Day 1 configuration to active VCMTS instance 36 and R-PHY entity 14, respectively. At 142, an appropriate CIN tunnel is generated between active VCMTS instance 36 and R-PHY entity 14. At 144 controller 48 may advertise the presence of active VCMTS instance 36 to the CM network.

At 146, state of active VCMTS instance 36 may be pushed to VCMTS state database 40. At 148, the change in VCMTS state database 40 may trigger a request to elastic services controller 32 to spawn standby VCMTS instance 38, and standby VCMTS instance 38 may be spawned thereupon by OpenStack VM/Storage orchestrator 34. Standby VCMTS instance 38 may have the same virtual IP address as active VCMTS instance 36. At 150, state of active VCMTS instance 36 may be pushed to standby VCMTS instance 38 in some embodiments. In other embodiments, standby VCMTS instance 38 may be spawned using state information corresponding to active VCMTS instance 36 that is stored in VCMTS state database 40. At 152, redundancy manager 46 may set active/standby roles for the VCMTS instances, for example, based on ownership of quorum token 74. At 154, a tunnel may be generated between active VCMTS instance 36 and standby VCMTS instance 38, for example, to exchange state and heartbeat messages 62. At 156, a CIN tunnel may be generated between R-PHY entity 14 and standby VCMTS instance 38 that is ready to accept data traffic.

Figure 11:
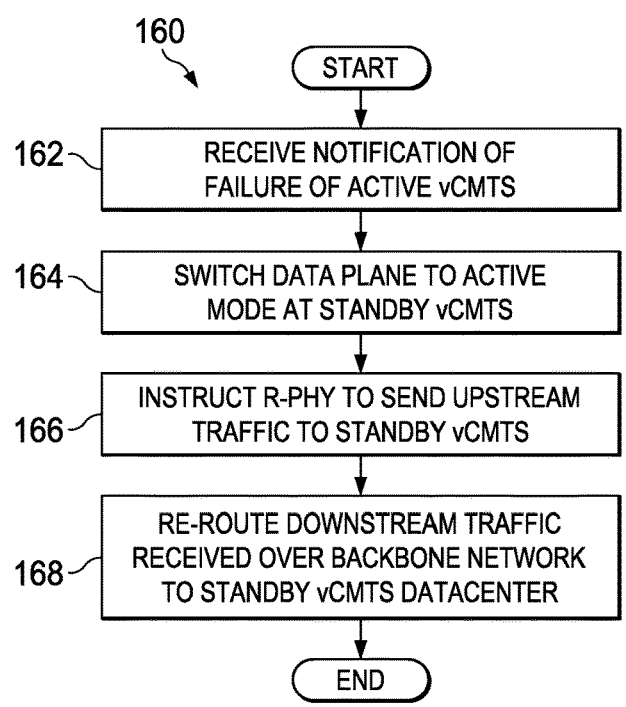
FIG. 11 is a simplified flow diagram illustrating yet other example operations that may be associated with an embodiment of the communication system.

Turning to FIG. 11, FIG. 11 is a simplified flow diagram illustrating example operations 160 that may be associated with an embodiment of communication system 10. At 162, redundancy manager 46 may receive notification of failure of active VCMTS instance 36. The notification may be received when quorum token 74 loses its owner; or other network state messages inform redundancy manager 46 of the failure event. At 164, redundancy manager 46 causes data plane 74 at standby VCMTS instance 38 to switch to active mode. At 166, redundancy manager 46 instructs R-PHY entity 14 to send upstream traffic to standby VCMTS instance 38. At 168, redundancy manager 46 re-configures backbone network 76 to re-route downstream traffic from Internet 78 to router 66 corresponding to data center hosting standby VCMTS instance 38. Note that if standby VCMTS instance 38 is executing in the same data center network as active VCMTS instance 36, such re-routing of backbone network 76 may not be necessary. Instead, data center network forwarding paths may be re-configured to switch traffic destined to active VCMTS instance 36 to standby VCMTS instance 38 instead.

Note that although the operations and systems are described herein with respect to a VCMTS, the operations and systems may be used with any virtual network function, including load-balancers, firewalls, WAN accelerators, etc., and the appliances that are associated therewith (e.g., customer premises equipment (CPE), cable modem (CM), etc.)

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/ perfectly efficient state.

In example implementations, at least some portions of the activities outlined herein may be implemented in software. In some embodiments, one or more of these features may be implemented in hardware, provided external to these elements, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, the VNFs and associated servers described and shown herein (and/or their associated structures) may also include suitable interfaces for receiving, transmitting, and/or otherwise communicating data or information in a network environment. The VNFs described herein may be provisioned on servers comprising memory elements and processors. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 58) can store data used for the operations described herein. This includes the memory element being able to store instructions (e.g., software, logic, code, etc.) in non-transitory media, such that the instructions are executed to carry out the activities described in this Specification. A processor (e.g., processor 56) can execute any type of instructions associated with the data to achieve the operations detailed herein in this Specification. In one example, processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in the communication system could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, the communication system may be applicable to other exchanges or routing protocols. Moreover, although the communication system has been illustrated with reference to particular elements and operations that facilitate the communication process, these elements, and operations may be replaced by any suitable architecture or process that achieves the intended functionality of the communication system.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    spawning, by an orchestration component executing using a processor, a first instance of a virtual network function (VNF) on a first server in a cable modem network;
    spawning a second instance of the VNF on a second server, wherein the first instance of the VNF comprises an active control plane and an active data plane, and wherein the second instance of the VNF comprises the active control plane and a standby data plane;
    configuring the second instance to be communicatively coupled to the first instance in a subnet of the cable modem network, wherein configuring the second instance to be communicatively coupled to the first instance further comprises:
        creating a first communication tunnel between the first instance and a remote physical layer (R-PHY) entity in the cable modem network,
        creating a second communication tunnel between the second instance and the R-PHY entity,
        communicating data traffic over the first communication tunnel between the first instance and the R-PHY entity,
        creating a third communication tunnel between the first instance and the second instance, and
        communicating heartbeat messages and state messages between the first instance and the second instance over the third communication tunnel; and
    synchronizing state between the first instance and the second instance.

2. The method of claim 1, wherein the VNF comprises a virtual cable modem termination system (VCMTS).

3. The method of claim 1, further comprising:
    detecting a failure of the first instance; and
    switching over the data traffic to the second communication tunnel between the second instance and the R-PHY entity.

4. The method of claim 3, further comprising instructing the R-PHY entity to forward upstream data traffic to the second instance.

5. The method of claim 3, further comprising reprogramming a backbone network to route downstream data traffic to the second instance, wherein the first server is located in a first network and the second server is located in a second network physically separate and remote from the first network and connected over the backbone network, wherein the downstream data traffic arrives from a third network destined to the first instance.

6. The method of claim 2, wherein synchronizing the state comprises configuration settings and communication parameters associated with communication channels between one or more cable modems and an R-PHY entity coupled to the first instance.

7. The method of claim 1, further comprising storing state of the first instance in a state database external to the first instance and the second instance, wherein the second instance is spawned based on the state stored in the state database.

8. The method of claim 1, wherein the second server is oversubscribed with a plurality of second instances of different VNFs.

9. The method of claim 1, wherein a plurality of second instances of the VNF corresponds to a single first instance of the VNF.

10. The method of claim 1, wherein the first instance and the second instance share a control plane in an active-active mode, wherein the first instance and the second instance share a data plane in an active-standby mode.

11. Non-transitory computer readable media that includes instructions for execution, which when executed by a processor, performs operations comprising:
    spawning, by an orchestration component executing using the processor, a first instance of a virtual network function (VNF) on a first server in a cable modem network;
    spawning a second instance of the VNF on a second server, wherein the first instance of the VNF comprises an active control plane and an active data plane, and wherein the second instance of the VNF comprises the active control plane and a standby data plane;
    configuring the second instance to be communicatively coupled to the first instance in a same subnet of the cable modem network, wherein configuring the second instance to be communicatively coupled to the first instance further comprises:
        creating a first communication tunnel between the first instance and a remote physical layer (R-PHY) entity in the cable modem network,
        creating a second communication tunnel between the second instance and the R-PHY entity,
        communicating data traffic over the first communication tunnel between the first instance and the R-PHY entity,
        creating a third communication tunnel between the first instance and the second instance, and
        communicating heartbeat messages and state messages between the first instance and the second instance over the third communication tunnel; and
    synchronizing state between the first instance and the second instance.

12. The non-transitory computer readable media of claim 11, wherein the VNF comprises a virtual cable modem termination system (VCMTS).

13. The non-transitory computer readable media of claim 11, wherein the operations further comprise:
    detecting a failure of the first instance; and
    switching over the data traffic to the second communication tunnel between the second instance and the R-PHY entity.

14. The non-transitory computer readable media of claim 12, wherein the state comprises configuration settings and communication parameters associated with communication channels between one or more cable modems and an R-PHY entity coupled to the first instance.

15. The non-transitory computer readable media of claim 11, wherein the operations further comprise storing state of the first instance in a state database external to the first instance and the second instance, wherein the second instance is spawned based on the state stored in the state database.

16. An apparatus, comprising:
    a memory element for storing data; and
    a processor, wherein the processor executes instructions associated with the data, wherein the processor and the memory element cooperate, such that the apparatus is configured for:
        spawning, by an orchestration component executing using the processor, a first instance of a VNF on a first server in a cable modem network;
        spawning a second instance of the VNF on a second server, wherein the first instance of the VNF comprises an active control plane and an active data plane, and wherein the second instance of the VNF comprises the active control plane and a standby data plane;
        configuring the second instance to be communicatively coupled to the first instance in a same subnet of the cable modem network, wherein configuring the second instance to be communicatively coupled to the first instance further comprises:
            creating a first communication tunnel between the first instance and a remote physical layer (R-PHY) entity in the cable modem network,
            creating a second communication tunnel between the second instance and the R-PHY entity,
            communicating data traffic over the first communication tunnel between the first instance and the R-PHY entity,
            creating a third communication tunnel between the first instance and the second instance, and
            communicating heartbeat messages and state messages between the first instance and the second instance over the third communication tunnel; and
        synchronizing state between the first instance and the second instance.

17. The apparatus of claim 16, wherein the VNF comprises a VCMTS.

18. The apparatus of claim 16, further configured for:
    detecting a failure of the first instance; and
    switching over the data traffic to the second communication tunnel between the second instance and the R-PHY entity.

19. The apparatus of claim 17, wherein the state comprises configuration settings and communication parameters associated with communication channels between one or more cable modems and an R-PHY entity coupled to the first instance.

20. The apparatus of claim 16, wherein the operations further comprise storing state of the first instance in a state database external to the first instance and the second instance, wherein the second instance is spawned based on the state stored in the state database.

* * * * *